Figure 1:
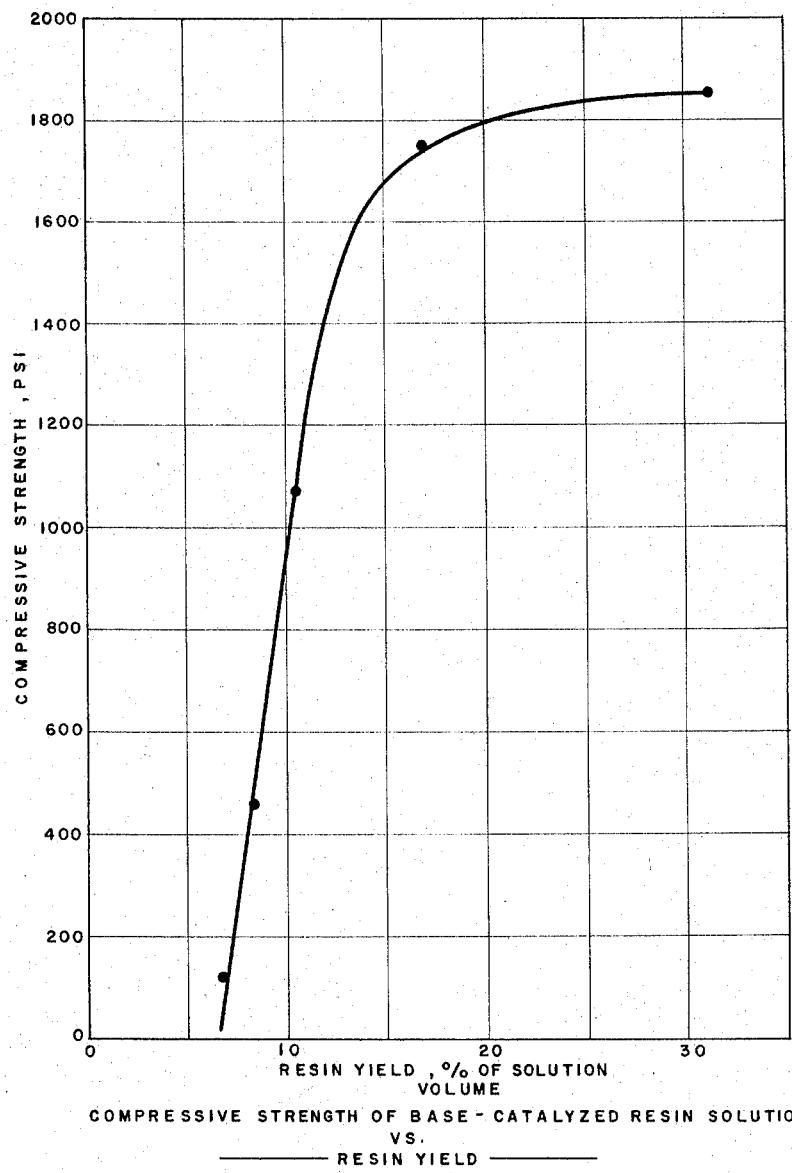

INVENTOR.
HORACE H. SPAIN,
BY John S. Schneider
ATTORNEY.

United States Patent Office 3,297,087
Patented Jan. 10, 1967

3,297,087
SAND CONSOLIDATION WITH RESIN-FORMING LIQUIDS
Horace H. Spain, Houston, Tex., assignor, by mesne assignments, to Esso Production Research Company, Houston, Tex., a corporation of Delaware
Filed Dec. 27, 1963, Ser. No. 333,970
5 Claims. (Cl. 166—33)

This invention concerns a method for consolidating loose or incompetent formations penetrated by a borehole. More particularly, this invention concerns an improved method for injecting sand consolidation fluids into subsurface formations in order to consolidate the formation sands. Still, more particularly, the invention relates to a resin solution used to consolidate these sands.

In producing fluids from subsurface formations, sand is produced along with the formation fluids from loosely consolidated formations. Various sand control measures to inhibit or prevent sand particles from moving into the well bore from the formations have been attempted because sand production with its attendant accumulation in the well bore or movement to the surface causes serious operational problems. One control measure that has been tried employs thermosetting plastics which set and bind the sand particles of the formation together while permitting flow of well fluids therethrough.

One good consolidating plastic of this type makes use of the resin-forming properties of the reaction between a water soluble aldehyde and a low molecular weight hydroxy aryl compound catalyzed by an alkaline or acid catalyst. When these compounds are injected into a subsurface formation, a resin forms which cements the particles of the formation together. Although any water soluble aldehyde may be used, formaldehyde, acetaldehyde, propionaldehyde, or mixtures thereof are preferred. The low molecular weight hydroxy aryl compound may include phenol, cresol, beta naphthol, resorcinol, or cresylic acid, or mixtures thereof. Suitable alkaline catalysts which may be used include guanidine salts such as guanidine carbonate and amino-guanidine bicarbonate; alkali metal hydroxides and carbonates such as sodium hydroxide or sodium carbonate; aliphatic amines such as ethyl amine and triethyl amine; aromatic amines such as aniline; and aliphatic diamines such as ethylene diamine. Suitable acidic catalysts which may be used include acidic salts such as stannous chloride or magnesium chloride; mineral acids, such as hydrochloric acid or sulfuric acid; acid anhydrides, such as maleic anhydride; aromatic acids, such as picric acid or benzene sulfonic acid or sulfonilic acid; and polynuclear aromatic acids or acid salts, such as alpha naphthylamine, sulfonic acid or sodium-1-naphthylamine-3,6,8-trisulfonate.

It is preferred to incorporate in the solution which deposits the resin-forming mixture into the formation, a moderate quantity of a silane chemical agent to obtain chemical bonding between the sand particles and the resin instead of the adhesive type bonding developed when sand is treated with the resin alone. The silane compound may be introduced into the formation as a preflush prior to the resin treatment instead of with the resin solution. United States patent application Serial No. 183,751, entitled "Sand Consolidation Methods" filed March 30, 1962, by H. H. Spain, describes and claims a technique in which the silane is introduced into the formation as a preflush.

The silane material to be used in these processes to strengthen the bond between the sand and the resin is an aminofunctional organo silane compound, typical examples of which are 2-aminoethyl-aminopropyl-trimethoxy silane; 2-aminoethyl-aminopropyl-tripropylene oxide silane; 2-aminoethyl-aminopropyl-triethylene oxide silane; 2-aminomethyl-aminopropyl-trimethoxy silane; 2-aminopropyl-aminopropyl-trimethoxy silane; 1-trimethoxy-2-aminoethyl-2-aminopropyl disilane; 1-triethylene oxide-2-aminoethyl-2-aminopropyl disilane; 1-tripropylene oxide-2-aminoethyl - 2 - aminopropyl disilane; 1-trimethoxy-2-aminomethyl - 2 - aminopropyl disilane; 1-trimethoxy-2-aminopropyl-2-aminopropyl disilane; and 1-trimethoxy-2-aminoethyl-2-aminoethyl disilane, and amino-triethoxy-silane.

There are large reserve of oils having rather high viscosity occurring in incompetent sands and to produce these oils at an economic rate, it is desirable to open long sections (e.g., longer than thirty feet) to production to decrease the pressure differential required for the production of these oils. To prevent the production of the formation sand, it is necessary to apply some means for sand control. Although the sand consolidation process has proven itself in practice, it has not been used often in these type fields because of the high cost of the chemicals. Heretofore, this process has been economically practicable in wells with short completion intervals in which only a few barrels of chemicals are required. In wells requiring long completion intervals, screens and gravel packs have been used instead with the usual faults accompanying their use of plugging and cutting out. Accordingly, it is desirable and advantageous to have a sand consolidation composition that may be used in these wells and it is to such a composition that this invention is directed.

The resin solution of this invention is much less expensive than those previously available, while at the same time retaining excellent sand consolidation properties. It can be readily changed to suit the requirements of each particular well to assure maximum economy consistent with effective consolidation of the sand.

Thus, a primary object of the present invention is to provide an improved resin composition for use in sand consolidation techniques that is economical, rapid-acting, and generally applicable to various types of formations. The composition is especially designed for use in treating long completion intervals.

The method of the invention may be briefly described as introducing into a subsurface formation a mixture of resin-forming liquids comprising a low molecular weight hydroxy aryl compound, a water soluble aldehyde, and a catalyst in a manner such that the liquids react and set in the formation and bind the sand particles thereof together, said resin-forming liquids being diluted so as to maintain an adequate resin yield and yet, achieve adequate compressive strength for the formation sands. A silane compound may be introduced as a preflush or with the resin-forming liquids to form a chemical bond between the sand particles and the resin.

Figure 2:
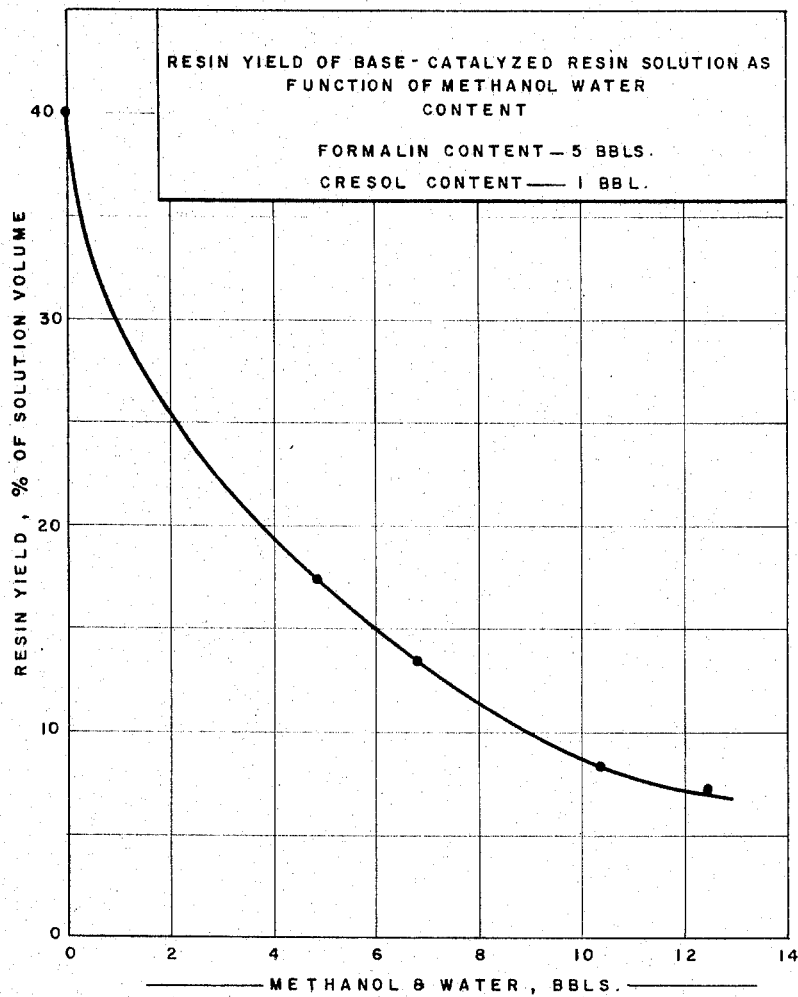

The above object and other objects and advantages of the invention will be apparent from a more detailed description of the invention when taken with the drawing in which:

FIG. 1 is a plot of compressive strengths for base-catalyzed resin solutions versus the resin yield; and FIG. 2 is a plot of the resin yield of the base-catalyzed resin solution as a function of the diluent content.

The cost of a given volume of resin solution is closely related to the resin yield which is the amount of resin produced per unit volume of solution. In sand consolidation operations in wells, the resin solution generally has a yield of 30 to 40 percent resin. I have discovered that this amount of resin is a considerably larger yield of resin than is required for effective sand consolidation.

A typical formula of a resin solution according to the invention is:

| | Barrels |
|---|---|
| Commercial Formalin | 5 |
| 3° meta-para cresol | 1 |
| Methyl alcohol | 2.25 |
| Fresh water | 4.5 |
| Guanidine carbonate | 305 |
| Sodium hydroxide | 38.8 |

This particular resin solution yields about 13 percent resin and costs about half as much as the solutions heretofore available. The resin yield is adjustable by varying the amounts of methyl alcohol and fresh water incorporated in the solution. However, for proper functioning of the solution, the ratio of methyl alcohol to water must be maintained at one part methyl alcohol to two parts water by volume.

The data of FIGS. 1 and 2 were obtained from experiments conducted in the following manner.

Silica sand was packed in a plastic tube. The sand was saturated with salt water and flooded with oil to simulate an oil-reservoir sand. Then, the reactive resin solution was flowed into the sand; the tube was heated in a constant-temperature bath to allow the resin to harden; and the compressive strength of the sand was measured. The volume percent resin yield of each solution tested for compressive strength was determined by placing the resin solution in a tube, heating the tube in a constant-temperature bath until the polymer separates from the remaining liquids, and then measuring the height of the polymer relative to the height of the solution. The amount of methyl alcohol and water diluent was varied using a ratio of formaldehyde to cresol of 5:1 to obtain the various resin yields and compressive strengths.

Referring to FIG. 1, it is seen that little additional strength is achieved with yields greater than 15%. It is to be noted that the strength with which sand is consolidated increases rapidly as the resin yield is increased until an amount of about 15% yield is reached. In addition, field experience has shown that compressive strengths on the order of 600 p.s.i. is adequate in many wells, which can be achieved with resin yields of about 9% as seen in FIG. 1. To obtain this yield, the standard solution of 5 parts Formalin to 1 part phenol, with the proper quantity of catalyst is diluted with about 10 barrels of the diluent. It is to be noted that little change of strength is found until the resin yield is decreased to about 20 percent, and to obtain a yield of 20% resin requires that the solution be diluted with 4 barrels of the methanol-water solution. Consequently, a preferred range for this diluent is between about 3 to 10 barrels. The resin solution of the invention can be designed for any required resin yield, thus minimizing the cost of treating any particular well.

Referring to FIG. 2, the variation in resin yield as a function of the quantity of methyl alcohol and water incorporated in the solution of the above-described formula is shown. Any desired resin yield up to about 40% resin yield can be obtained by varying the methanol-water content. This resin solution is designed for the treatment of an earth formation in which the temperature is about 140° F. However, formulations for other earth temperatures can be made readily by varying, in this instance, the quantities of guanidine carbonate and sodium hydroxide employed, which materials are the catalytic materials in the solution.

Materials other than methyl alcohol which may be used as the diluent solution with the water are, for example, ethyl alcohol and dioxane, either the 1,3 trimethylene methylene dioxide or the 1,4 diethylene dioxide. The requirements for a suitable solution for a diluent are (1) it must be mutually soluble in water; (2) it must dissolve in the resin mixture; (3) it should not change the time for the separation of the liquid polymer or that separation time should be subject to control after the resin solution has been diluted; and (4) the hardening time for the resin should not be changed, or it should be capable of control. If the separation time or the hardening time is changed, they may be controlled by alteration of the catalyst concentration.

Methanol is the preferred diluent when used with two parts of water and one part of methanol by volume. The amount of dilution of the other solvents can be determined by testing for the separation and hardening of the polymer from a solution of Formalin, phenol, catalyst, and the diluent. The amount of catalyts may be adjusted to give a desired separation hardening time.

The stannous chloride acid catalyst, when employed, is used in the amount of from 4 to 8% by weight of the total resin-forming liquid volume.

Having fully described the nature, objects, advantages, and operation of my invention, I claim:

1. In a method for consolidating the sands of an incompetent, subsurface, petroleum-bearing formation in which a mixture of resin-forming liquids comprising a low molecular weight hydroxy aryl compound, a water soluble aldehyde, and a catalyst is introduced into said formation, said liquids reacting and setting in said formation and binding the sand particles thereof together and in which an amino-functional organo silane also is introduced into said formation, the improvement comprising diluting said resin-forming liquids with amounts of a methyl alcohol and water solution diluent dissolvable in said resin-forming liquids such that the resin yield of the resultant resin solution is in the range from a minimum where a desired minimum compressive strength of the sands is provided to a maximum where increased resin yield does not substantially increase the compressive strength of the sands.

2. A method as recited in claim 1 in which said resin yield is between about 9 and 20 percent of said resin solution volume.

3. A method as recited in claim 2 in which said aldehyde and hydroxy aryl compound are in a ratio of about 5:1 and said water and methyl alcohol are employed in a ratio of about 2:1.

4. A method as recited in claim 3 in which said catalyst is an alkaline catalyst.

5. A method as recited in claim 3 in which said catalyst is an acidic catalyst.

References Cited by the Examiner

UNITED STATES PATENTS

| 2,476,015 | 7/1949 | Wrightsman | 166—33 |
| 2,573,690 | 11/1951 | Cardwell | 166—33 |
| 2,770,306 | 11/1956 | Clark | 166—33 |
| 3,170,516 | 2/1965 | Holland et al. | 166—33 X |
| 3,180,416 | 4/1965 | Smith | 166—33 |
| 3,221,814 | 12/1965 | Hower | 166—33 |

JACOB L. NACKENOFF, *Primary Examiner.*

S. J. NOVOSAD, *Assistant Examiner.*